US007783642B1

(12) United States Patent
Feng et al.

(10) Patent No.: US 7,783,642 B1
(45) Date of Patent: Aug. 24, 2010

(54) SYSTEM AND METHOD OF IDENTIFYING WEB PAGE SEMANTIC STRUCTURES

(75) Inventors: Junlan Feng, Basking Ridge, NJ (US); Barbara B. Hollister, Mountainside, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 280 days.

(21) Appl. No.: 11/263,055

(22) Filed: Oct. 31, 2005

(51) Int. Cl.
*G06F 7/00* (2006.01)
*G06F 17/30* (2006.01)
*G06F 17/00* (2006.01)
*G06N 7/00* (2006.01)
*G06N 7/08* (2006.01)

(52) U.S. Cl. .................................... 707/739; 706/55
(58) Field of Classification Search ........... 707/3
See application file for complete search history.

(56) References Cited

U.S. PATENT DOCUMENTS

2002/0026462 A1* 2/2002 Shotton et al. ............... 707/523
2003/0225750 A1* 12/2003 Farahat et al. ................. 707/3
2006/0224690 A1* 10/2006 Falkenburg et al. ......... 709/217

OTHER PUBLICATIONS

Junlan Feng, et al., "WebTalk: Mining websites for Automatically Building Dialog systems", Proc. Of IEEE ASRU 2003, St.Thomas, U.S. Virgin Islands, Dec. 2003.
Saikat Mukherjee, et al., "Automatic Discovery of Semantic Structures in HTML Documents", ICDAR 2003.
Yu Chen, et al., "Detecting Wed Page Structure for Adaptive Viewing on Small Form Factor Devices", Proc. Of WWW 2003, May 20-24, 2003, Budapest,Hungary.
Shipeng Yu, et al., "Improving Pseudo-Relevance Feedback in Web Information Retrieval Using Web Page Segmentation", WWW 2003.
Matthew Hurst, "Layout and Language: An efficient Algorithm for Detecting Text Blocks Based on Spatial and Linguistic Evidence", Proc. Of Document Recognition and Retrieval VIII pp. 56-67, 2001.
Patrick Haffner, et al., "Optimizing SVMS For Complex Call Classification" in ICASSP'03, Apr. 2003.
Line Eikvil, "Information Extraction from World Wide Web—A Survey", Rapport Nr. 945, Jul. 1999. ISBN 82-539-0429-0.
Document Object Model (DOM) http://www.w3.org/DOM/ W3C Architecture Domain, printed Oct. 25, 2005.
Corinna Cortes, et al., "Support-Vector Networks", Machine Learning, 20:273-297, 1995.
Robert E. Schapire, et al., "BoosTexter: A Boosting-based System for Text Categorization" Machine Learning, vol. 39, No. 2/3, pp. 135-168, 2000.
Christina Yip Chung, et al., "Reverse Engineering for Web Data: From Visual to Semantic Structures", ICDE, 2002.
Yudong Yang, et al., "HTML page analysis based on visual cues", ICDAR 2001.

* cited by examiner

*Primary Examiner*—Charles Rones
*Assistant Examiner*—Kris Mackes

(57) ABSTRACT

The disclosure presents a method, system and computer-readable medium related to automatically analyzing structure for a web page. The method embodiment comprises building a training corpus comprising a broad stylistic coverage of web pages, segmenting a web page into information blocks, identifying semantic categories of the information blocks using the training corpus and applying the identical semantic categories in a web-based tool.

14 Claims, 4 Drawing Sheets

SYSTEM AND METHOD OF IDENTIFYING WEB PAGE SEMANTIC STRUCTURES

BACKGROUND OF THE INVENTION

1. Field of the Invention

The present invention relates to a system and method of identifying web page semantic structures.

2. Introduction

In spite of recent progress on the semantic web and interchange formats like XML, most available web pages today are still written in HTML and designed mainly for humans and not machines to read. Information conveyed on HTML pages is carried not only by their stream of texts, but also by the layout of the web pages. For instance, the web page in FIG. 2 consists of a form and a horizontal menu on the top, a heading-content visual block and a vertical menu on the left, and several heading-content and normal-content descriptions in the center. Humans can easily recognize this structure by following visual clues and language clues. A variety of web-based applications have begun to exploit web page semantic structures. For example, web page layout extraction is a fundamental component of AT&Ts WebTalk, which is a framework for automatically constructing dialog systems using company websites. Others have used web page semantic structures for adaptively displaying web pages on small devices or to build a domain specific product extraction system such as DataRover, which is based on a web page segmentation algorithm.

However, automatically recognizing web page semantic structures is by no means an easy task. An HTML developer can choose using templates, white spaces, images, tables, dozens of HTML tags, hundreds of HTML attributes, or a combination of them to artistically lay out a page. HTML source codes for rendering the same web page could be dramatically different from one developer to another.

The Document Object Model (DOM) is widely used as the representation model of HTML documents. FIG. 3 shows a DOM tree fragment for the web page in FIG. 2. Several DOM-based heuristic algorithms have been developed for discovering the semantic structures of web pages. These algorithms are initiated by two key observations, which are:

First, contiguous leaf nodes on the DOM tree are semantically related if they have similar root-to-leaf tag paths. Based on this observation, researchers have developed a web page segmentation algorithm that takes the DOM tree as input and collects the root-to-leaf tag-path for each leaf node on the tree. A segment boundary is found, when the tag-path similarity between two contiguous leaf nodes is below a predefined threshold 6. Based on the same observation, a more complex algorithm has been proposed to group the leaf nodes in the DOM into a semantic partition tree. See, Saikat Mukerjee, GuiZhen Yang, WenFang Tan, I. V. Ramakrishnan, "Automatic Discovery of Semantic Structures in HTML Documents", ICDAR 2003, incorporated herein by reference.

Second, semantic blocks on a web page are often separated by visual separators such as lines, blank areas, images, font sizes, colors, etc. A Vision-based Page Segmentation (VIPS) algorithm has been proposed to detect the semantic content structure in a web page. VIPS makes use of the DOM structure as well as visual cues of DOM tree nodes including position, color, font size, font weight, etc. A list of heuristic rules are implemented to determine the visual blocks. An example of such a rule is dividing a DOM node if its background color is different from one of its children's.

These observations and the above discussed algorithms addressed part of the web page authors' intents for layout presentation. However, there are much more complex and richer cues remaining unemployed but intensively encoded by web page authors and used by web page readers such as language features, geometric cues, miscellaneous HTML attributes, etc. As a result, the effectiveness of these algorithms is only limited to some circumstances.

An HTML document is encoded through HTML tags (such as "<font>"), attributes (such as "color"), attribute values (such as "color=#003355"), as well as text (such as "ZOOM VARplus Program" in FIG. 2). HTML 4.01 Specification, incorporated herein by reference as well as updates to the HTML protocol, specifies 91 HTML tags and 119 attributes. They are used to govern the structure, the presentation of the rendered web page as well as the interactivity with the web page. Given this complexity, it is difficult if not impossible to develop a heuristic algorithm that is able to appropriately take into account this large number of contributing factors for the web page semantic structure.

INVENTION SUMMARY

This application discusses a machine learning approach and the features that are used for web page segmentation and web page information block classification. Experiments and experimental results are presented.

The present invention addresses the issues in using machine learning techniques to treat web page semantic structures as a task involving web page segmentation and information block classification. An information block is defined as a coherent topic area according to its content or a coherent functional area according to its associated behavior. An aspect of the invention is to define a group of semantic categories (e.g. 12 categories) for classifying web page information blocks into including Page-Title, Form, Table-Data, FAQ-Answer, Menu, Bulletined-List, Heading, Heading-List, Normal-Content, Heading-Content, Picture-Label, and Other. FIG. 2 illustrates this task with an example where a web page is segmented into information blocks. In this example, there are eight different types of segmented blocks. The segmentation may be a single block or any plurality of blocks and each of these blocks is assigned a category. Such an analysis can benefit a wide spectrum of web-based applications including search engines, question answering and data mining systems. For example, a search engine can potentially retrieve better search results by exploiting these semantic categories and applying different weights to them.

The disclosure presents a method, system and computer-readable medium related to automatically analyzing structure for a web page. The method embodiment comprises building a training corpus comprising a broad stylistic coverage of web pages, segmenting a web page into information blocks, identifying semantic categories of the information blocks using the training corpus and applying the identical semantic categories in a web-based tool.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1A:
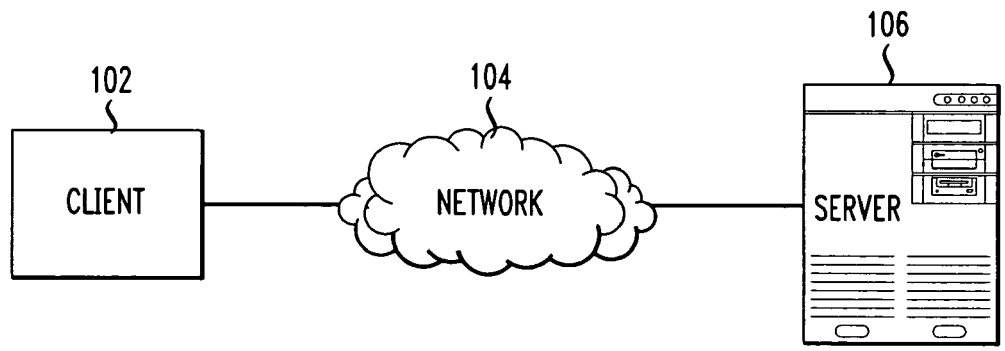
FIG. 1A illustrates the basic communication between a client and a server.

FIG. 1A illustrates a simple arrangement of a client computing device 102 communicating through a network 104 with a computing server 106. Each of these components is known to those of skill in the art. Variations on this basic arrangement are also known—such as the ability of the network 104 to be a cellular network, telephone network, cable network, any type of wireless network such as a Bluetooth based network, or any other type of wireless communication network. The computing device 102 may be a desktop computer, laptop computer, portable computing device, smartphone, or any other type of computing device. The server 106 is typically a server upon which a website operates and is used to communicate web pages to the client 102. The basic functionality of the invention is independent of the type of computing device or network through which computing devices communicate.

Figure 1B:
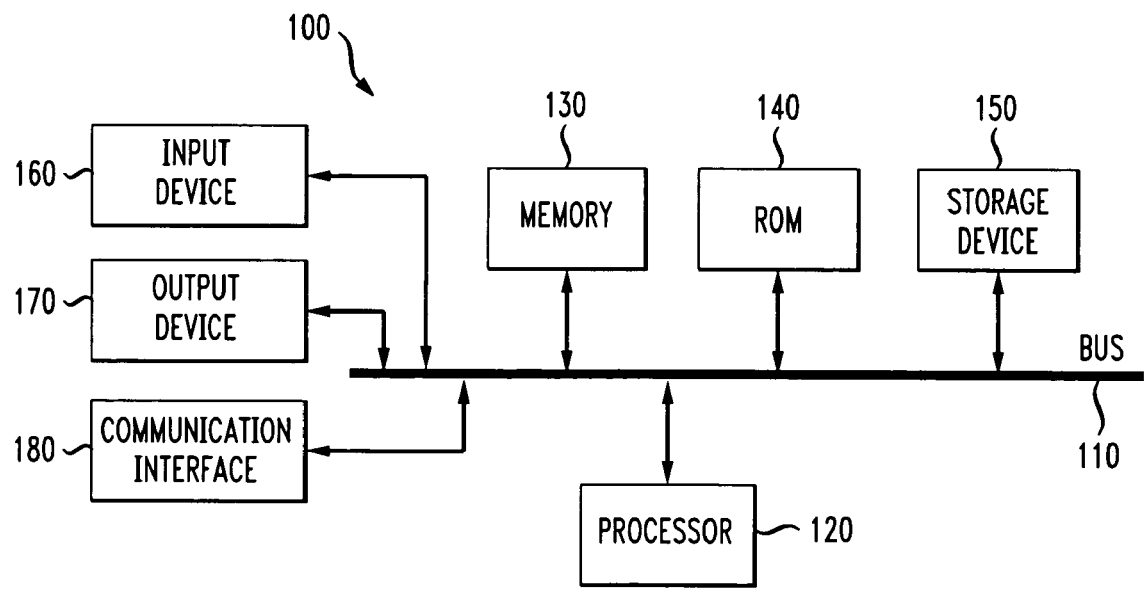
FIG. 1B illustrates the basic components of a computing device for use with the invention.

FIG. 1B illustrates an exemplary processing system 100 upon which implementations consistent with the principles of the invention may execute. System 100 may include a bus 110, a processor 120, a memory 130, a read only memory (ROM) 140, a storage device 150, an input device 160, an output device 170, and a communication interface 180. Bus 110 may permit communication among the components of system 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. Storage device 150 may include a database that includes a number of records including strings that may be compared with one or more search strings in implementations consistent with the principles of the invention.

Input device 160 may include one or more conventional mechanisms that permit a user to input information to system 100, such as a keyboard, a mouse, a pen, a voice recognition device, etc. Output device 170 may include one or more conventional mechanisms that output information to the user, including a display, a printer, one or more speakers, or a medium, such as a memory, or a magnetic or optical disk and a corresponding disk drive. Communication interface 180 may include any transceiver-like mechanism that enables system 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Figure 2:
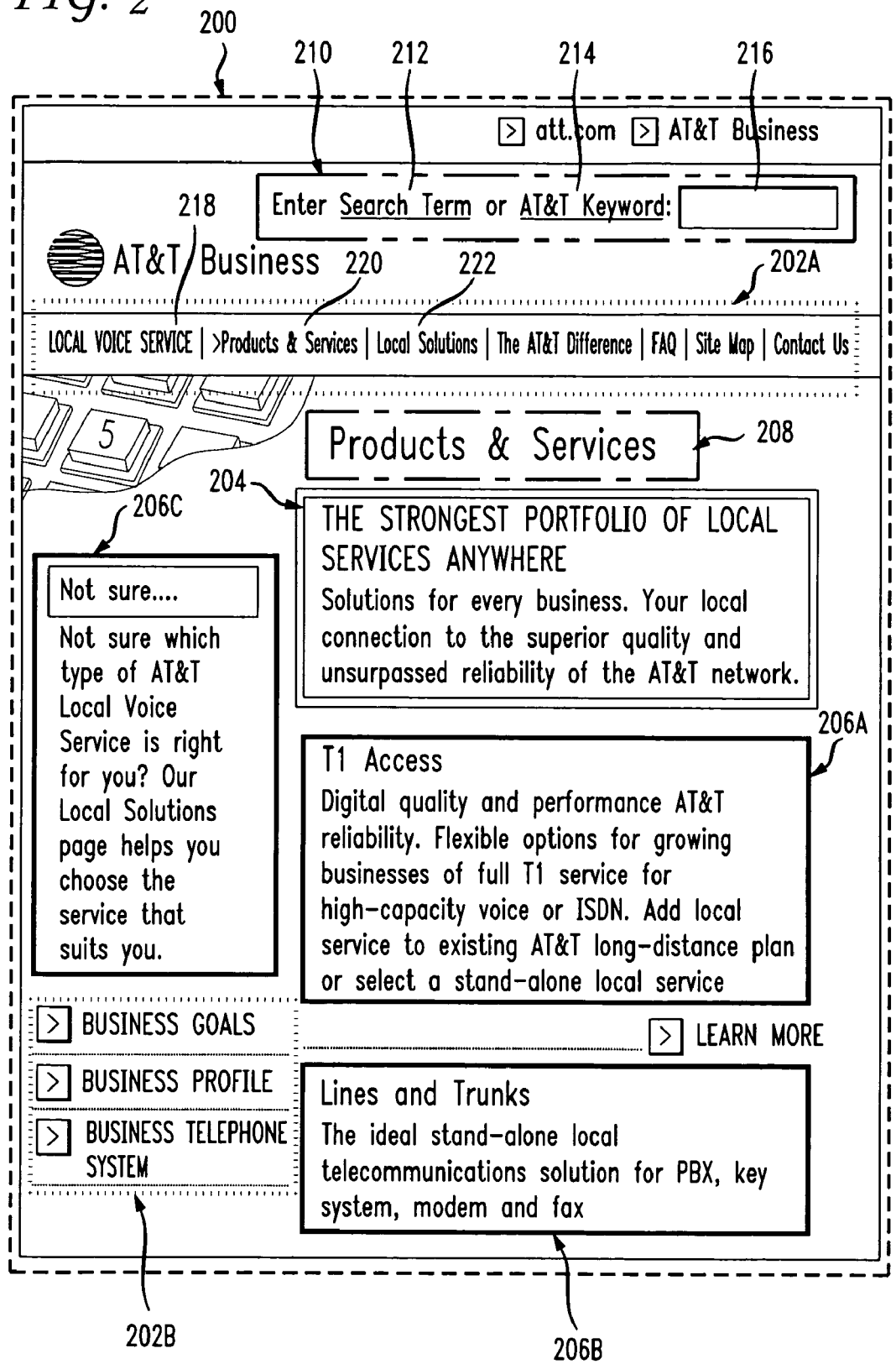
FIG. 2 illustrates an example web page.

Web page segmentation is a task to group text nodes on a web page into a sequence of information blocks. This task may be characterized as a binary classification problem. An exemplary web page 200 from AT&T is organized for a user to see as is shown in FIG. 2. Features include links 210 with options to enter search terms 212, or an AT&T keyword 214 with a search field 216 for the user to insert text. Other options include choosing links to other pages such as a local voice service 218, products and services 220, local solutions 222, and so forth in box 202A. A larger title is highlighted as 208 and other boxes 204, 206A, 206B, 206C and 202B show different groupings of text in the web page 200. For each pair of contiguous text nodes (such as "Enter" and "Search Terms" in FIG. 2), a set of features is built to represent the distance and difference between them, and then classify this feature set into the information block boundary class or the non-boundary class. These two nodes are separated into two information blocks, if a boundary is identified between them.

Web page information block classification is, for example, a 12-class classification task. The class may be zero, one or a plurality-class classification. Adaboost and SVMs are two popular machine learning algorithms for the problem of classification. Both of them are capable of inferring regularities using many heterogeneous features and generalizing without requiring the careful feature selection. These capabilities are just what we need in this learning task, since web page structures are characterized by a large number of features and it is not clear which of them are efficiently contributing.

Training examples can be represented as: $(x_1, y_1), \ldots (x_i, y_i), \ldots (x_N, y_N)$, where each $x_i$ is a feature set belonging to a space X, and each $y_i$ is in some label set Y. Adaboost calls a given weak learning algorithm repeatedly in a series of rounds $t=1, \ldots, T$. Each time the weak learning algorithm is applied, it generates a rough rule of thumb. And after many rounds Adaboost combines these weak rules into a single prediction rule that is typically more accurate on predicting $y_i$ than any one of the weak rules.

Those of skill in the art will be familiar to Adaboost and other Adaboost-based algorithms. The preferred system is Boostexter, an Adaboost-based system for text categorization, as the boosting-based learning and testing tool. Boostexter has been widely used and proved to be a state-of-the-art technique for text classification. It works with data which may be of various forms. In general, each instance is broken into multiple fields. These fields may be of four types: a continuous-valued attribute (such as "age"), a discrete-valued attribute (such as "eye color"), a text string (such as "body of an email message"), and a scored text string (in which scores are associated with each word of the text). Other types may also be identified and utilized.

SVM is a kernel-based learning algorithm for optimizing separating hyper planes between $y_i$. A kernel is a function that maps the input data X into a high dimensional feature space. The preferable algorithm for SVM training is the Llama tool as the SVM training and testing tool. Llama is an implementation of multi-class SVMs with heterogeneous kernels. It allows the user to specify a list of hypotheses kernels to explore. Validation sets are set apart automatically and used to determine the optimal kernel to learn each class against all others. Llama works with data of continuous and discrete values.

The advantage for applying Machine Learning to this task is that it enables one to make use of a large number of heterogeneous features without clearly knowing which of them are effectively contributing and how they collaborate with each other.

Figure 3:
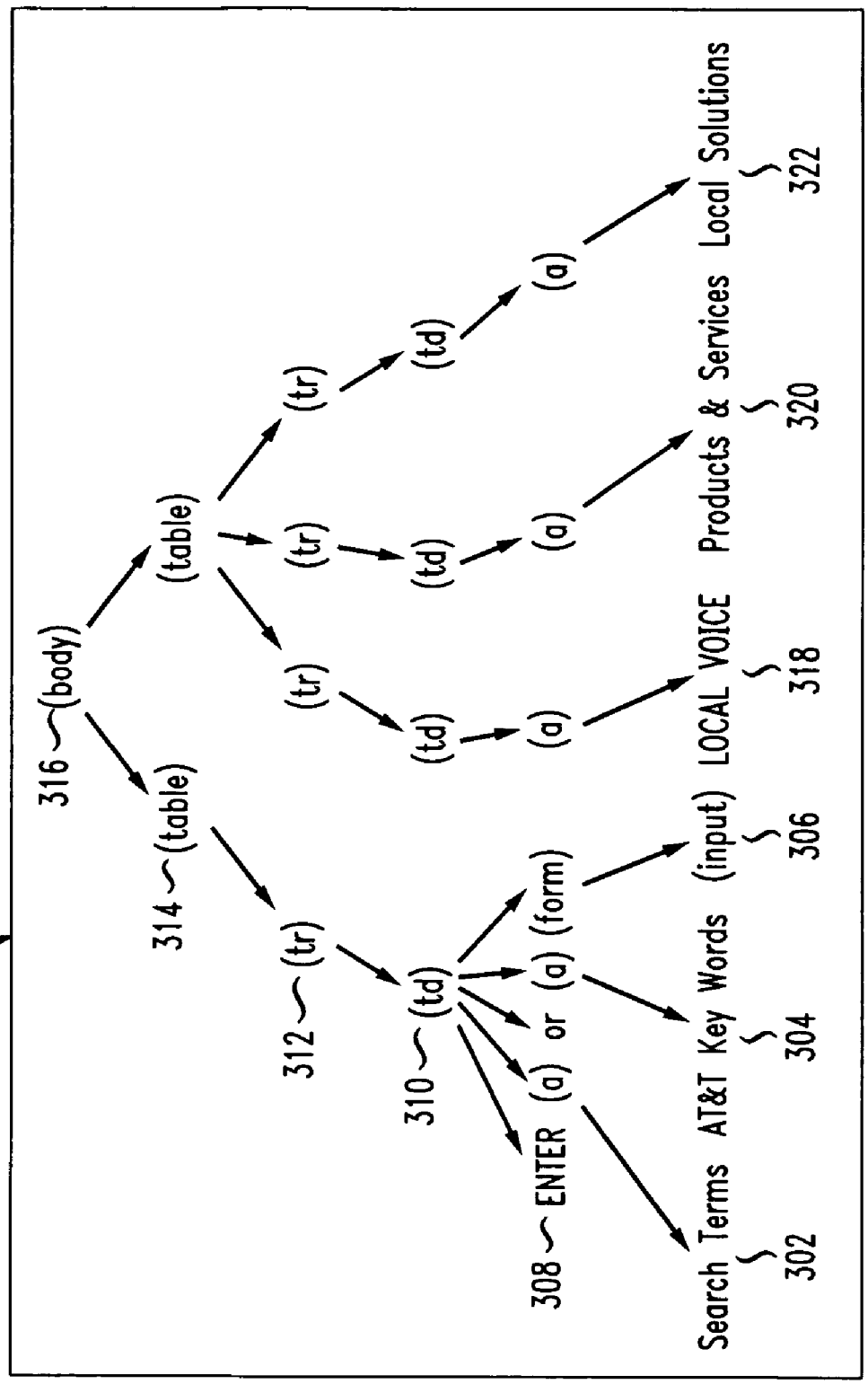
FIG. 3 illustrates an example DOM tree arrangement.

Given that both web page segmentation and information block classification focus on processing texts, the inventors attempted to collect all related features for each text node $t_i$, where i is the number of the text node on the DOM tree ordered from left to right. Related features may include a wide variety of parameters and include at least a representation mode structure feature, a geometric feature, an HTML attribute, neighboring nodes and linguistic features. Examples of these features are given and explained in the following:

DOM tree structure features including the root-to-leaf tag-path and the address of $t_i$ on the DOM tree. For example, in FIG. 3, a DOM 300 is shown with the root-to-leaf tag-path for "enter" 308 is "<body> 316 <table> 314 <tr> 312 <td> 310". The DOM address of "enter" is "0.0.0.0.1", which is ordered from top to bottom and from left to right starting from 0. FIG. 3 further illustrates other features of this particular DOM which is associated with the web page of FIG. 2: search words 302, AT&T keywords 304, input 306, local voice 318, products and services 320 and local solutions 322.

Geometric features such as the vertical and horizontal position where this text appears on the web page are also analyzed. There are 119 attributes specified in the HTML 4.01 Specification and these attributes are also analyzed. Attributes encode visual features such as the color, font, background color, and size, interactivity features such as hyperlinks and submitting actions, as well as miscellaneous features including id, style, class and so on. Neighboring nodes also include another feature used in the analysis. The leaf nodes between $t_i$ and $t_{i+1}$ are denoted as neighboring nodes $N_i$. Neighboring nodes of $t_i$ include $N_{i-1}$, and $N_i$. These nodes are important cues for the web page semantic structures. They might appear as separators (e.g. a node with the tag <hr>) or interactivity fields (e.g., <input>). They directly affect the semantic role of the neighboring texts. Linguistic features are important cues that humans often use to realize the web page structure but remain unexplored because of the large dimensionality. In our experiments, we use unigrams and bigrams as the linguistic features (see table 2 below).

For web page segmentation, the invention involves calculating the differences and distances between the above features of two contiguous text nodes $t_i$ and $t_{i+1}$. These features are used as inputs for our machine learning algorithms. When using Boostexter, these features are represented with text strings, discrete values, continuous values and scored text strings. A more detailed feature list is given in Table 1. When using Llama-SVM, text-string and scored-text-string features are respectively converted to discrete values and continuous values in advance.

TABLE 1

| Feature Forms | Features |
| --- | --- |
| Continuous | DOM-Tree position distance |
| | Vertical and horizontal distance |

TABLE 1-continued

| Feature Forms | Features |
| --- | --- |
| Discrete | Attribute differences. |
| Text Strings | Difference of the root-to-leaf tag-paths |
| Scored Text Strings | Leaf nodes between $t_i$ and $t_{i+1}$. |
| | Difference of neighboring non-text nodes of $t_i$ and $t_{i+1}$ |

For information block classification, the inventors use the overall properties of a given information block as the feature set to learn. As described above, a group of semantic categories (such as 12) are defined for web page information blocks. Information blocks are denoted starting from the text node $t_i$ and ending with the text $t_j$ node as $b_{ij}$, where $j \geq i$. The features in Table 2 are used to characterize $b_{ij}$.

TABLE 2

| Feature Forms | Features |
| --- | --- |
| Continuous | The total number of words in $b_{ij}$ |
| | The average number of words on each text node |
| | The variance of the number of words at each text node within |
| | The ratio of numeric words in this information block |
| | Geometric Position of $b_{ij}$ |
| | The number of text nodes within $b_{ij}$ |
| Text Strings | Unigrams and bigrams of the text string within $b_{ij}$ |
| Scored Text Strings | All tags used in the nodes within $b_{ij}$ |
| | Neighboring nodes of $b_{ij}$ |
| | Attributes of the nodes within $b_{ij}$ |

These features are developed based on a variety of heuristic observations. Machine Learning is expected to make a decision considering all these factors.

In order to learn a general model for discovering web page semantic structures, a training corpus needs to be built consisting of web pages covering a broad variety of styles. To serve this purpose, website URLs are collected. The inventors collected 13119 business website URLs and randomly retrieved 1 web page from each of them. A web page labeling tool was developed through which labelers can conveniently enter their understanding of the semantic structure of a given HTML page. Appendix A, incorporated herein by reference, provides an example of a labeling guide for a labeler. This guide includes example web page structure categories as well as information on how to use the labeling tool. As a result of using this labeling tool, each labeled web page is specified as a sequence of triplets: {from, to, category}. "from" and "to" are ordering numbers of text nodes. "category" is one of the categories listed in Table 3.

As part of ongoing work, 2000 web pages in this web page collection had been labeled by three labelers. 32874 information blocks were labeled on these 2000 pages. Table 3 lists the frequency of information block categories in the database for each of these semantic categories.

TABLE 3

| Category | Frequency |
| --- | --- |
| Heading-Content | 6622 |
| Menu | 6215 |
| Heading | 5262 |
| Other | 4823 |

TABLE 3-continued

| Category | Frequency |
| --- | --- |
| Normal-Content | 3357 |
| Heading-List | 1873 |
| Form | 1652 |
| Page-Title | 1177 |
| FAQ-Answer | 858 |
| Table-Data | 519 |
| Picture-Label | 375 |
| Bulletined-List | 141 |

5-fold cross-validation experiments were performed with Boostexter and Llama SVM with polynomial kernels of different degree p.

Table 4 reports the experimental results for web page segmentation with Boostexter and Llama SVM of degree 2 polynomial (Llama-SVM-p2).

TABLE 4

| | Classification Error (%) | |
| --- | --- | --- |
| 5-Folds | Boostexter | llama-SVM-p2 |
| 1 | 9.1 | 8.6 |
| 2 | 9.1 | 8.4 |
| 3 | 10.5 | 9.7 |
| 4 | 9.3 | 8.2 |
| 5 | 9.0 | 8.1 |
| Average. | 9.4 | 8.6 |

Another evaluation measure for boundary detection is based on measures used in the field of Information Extraction [9] including precision, recall and F1. Precision is the ratio of the correct boundaries among the boundaries the classifier produces. Recall refers to the probability of correct boundaries that has been detected. F1 combines precision P and R as follows:

$$F1 = \frac{2PR}{P+R}$$

Table 5 gives the precision, recall and F1 using Boostexter and Llama-SVM-p2. The results are averaged over the five folds.

TABLE 5

| | Boostexter | Llama-SVM-p2 |
| --- | --- | --- |
| Precision | 82% | 77% |
| Recall | 68% | 84% |
| F1 | 74.7% | 81% |

Table 6 reports the experimental results of information block classification with Boostexter and Llama SVM of degree 1 polynomial (Llama-SVM-p1).

TABLE 6

| | Classification Error (%) | |
| --- | --- | --- |
| 5-folds | Boostexter | Llama-SVM-p1 |
| 1 | 18.9 | 16.4 |
| 2 | 18.0 | 14.7 |
| 3 | 22 | 11.1 |
| 4 | 20.7 | 15.3 |
| 5 | 19.8 | 15.4 |
| Average. | 19.8 | 14.1 |

These preliminary results encouragingly indicate the effectiveness of this proposed learning framework.

Figure 4:
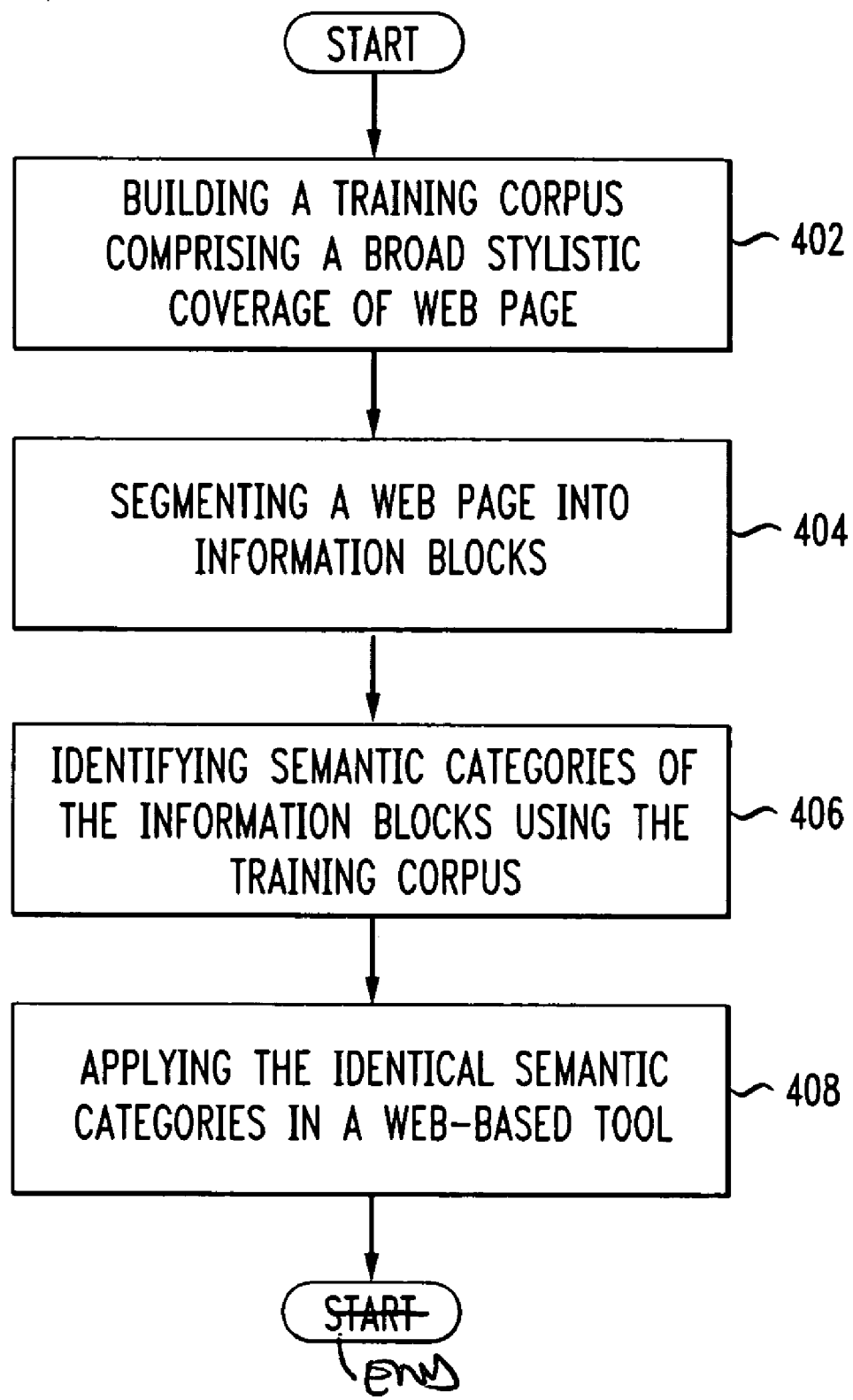
FIG. 4 illustrates a method embodiment of the invention.

FIG. 4 illustrates the method embodiment of the invention. The method of automatically analyzing structure for a web page comprises building a training corpus comprising a broad stylistic coverage of web pages (402), segmenting a web page into information blocks (404), identifying semantic categories of the information blocks using the training corpus (406) and applying the identical semantic categories in a web-based tool (408). Other steps in the invention are mentioned throughout this disclosure. The steps of segmenting a web page and identifying semantic categories may be done in a one-pass process or a two-pass process.

Understanding a web page requires recognizing and using web page structure. This disclosure proposes an approach to applying machine learning algorithms including Adaboost and SVMs to web page semantic structure discovery. This task involves web page segmentation (segmenting a web page into smaller information blocks) and information block classification (identifying the semantic categories of these smaller information blocks). To achieve this purpose, the inventors built a training corpus consisting of web pages of a broad stylistic coverage from the World Wide Web and have these pages manually labeled. Experimental results using 5-fold cross-validation on 2000 labeled web pages show:

Web page information block boundaries can be located with 81% F1 using polynomial SVM of degree 2 and 74.7% F1 using Adaboost. Web page information blocks are classified into preferably 12 categories with 85.9% accuracy using polynomial SVM of degree 1 and 79% accuracy using Adaboost. This work can be beneficial to a number of web-driven applications such as search engines, web-based question answering, web-based data mining as well as voice enabled web navigation such as via natural language dialog system. Other web-based tools may also utilize the basic features and benefits of the present invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. However, any recitation of a "tangible" computer-readable medium expressly excludes non-statutory subject matter as a wired or wireless signed per se. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A computer-implemented method of automatically analyzing structure for a web page, the method comprising:
building a training corpus comprising a broad stylistic coverage of web pages, wherein each labeled webpage of the training corpus is specified as a sequence of {from, to, category} triplets, wherein "from" and "to" are related to an ordering of numbers of text nodes within each respective labeled webpage;
segmenting via a processor the web page by grouping all the text nodes of the web page into a sequence of information blocks and identifying via the processor semantic categories of the information blocks using the training corpus and an adaboost-based text configuration tool, wherein the segmenting and identifying are part of a two-pass process; and
applying the identified semantic categories in a natural language spoken dialog system for voice enabled web navigation.

2. The method of claim 1, further comprising labeling the training corpus either manually or automatically using a web page labeling tool.

3. The method of claim 1, further comprises building a feature set representing a distance and difference between each pair of contiguous text nodes.

4. The method of claim 3, further comprising classifying the feature set into one of an information block boundary class or a non-boundary class.

5. The method of claim 4, wherein the classifying step is a multi-class classification step.

6. The method of claim 4, wherein a machine learning algorithm is used for the classification step.

7. The method of claim 4, further comprising:
identifying related features for each text node in a representation model for the web page.

8. The method of claim 7, wherein the related features comprise at least one of: a representation mode structure feature; a geometric feature; an HTML attribute; neighboring nodes; and linguistic features.

9. A system for automatically analyzing structure for a web page, the system comprising:
a processor;
a module configured to control the processor to build a training corpus comprising a broad stylistic coverage of web pages, wherein each labeled webpage of the training corpus is specified as a sequence of {from, to, category} triplets, wherein "from" and "to" are related to an ordering of numbers of text nodes within each respective labeled webpage;
a module configured to control the processor to segment the web page by grouping all the text nodes of the web page into a sequence of information blocks and identify semantic categories of the information blocks using the training corpus and an adaboost-based text configuration tool, wherein the module configured to control the processor to segment and identify uses a two-pass process; and
a module configured to control the processor to apply the identified semantic categories in a natural language spoken dialog system for voice enabled web navigation.

10. The system of claim 9, further comprising a module configured to control the processor to build a feature set representing a distance and difference between each pair of contiguous text nodes.

11. The system of claim 10, further comprising a module configured to control the processor to classify the feature set into one of an information block boundary class or a non-boundary class.

12. The system of claim 9, further comprising a module configured to control the processor to identify related features for each text node in a representation model for the web page, wherein the related features comprise at least one of: a representation mold structure feature; a geometric feature; an attribute; neighboring nodes; and linguistic features.

13. A tangible computer-readable medium storing instructions for controlling a computing device to automatically analyze structure for a web page, the instructions comprising:
building a training corpus comprising a broad stylistic coverage of web pages, wherein each labeled webpage of the training corpus is specified as a sequence of {from, to, category} triplets, wherein "from" and "to" are related to an ordering of numbers of text nodes within each respective labeled webpage;
segmenting via the processor the web page by grouping all the text nodes of the web page into a sequence of information blocks and identifying via the processor semantic categories of the information blocks using the training corpus and an adaboost-based text configuration tool, wherein the segmenting and identifying are part of a two-pass process; and
applying the identified semantic categories in a natural language spoken dialog system for voice enabled web navigation.

14. The tangible computer-readable medium of claim 13, further comprising building a feature set representing a distance and difference between each pair of contiguous text nodes.

* * * * *